Jan. 9, 1940. C. F. THOMPSON 2,186,049
OPTICAL PROJECTING MECHANISM
Original Filed July 31, 1936 10 Sheets-Sheet 1
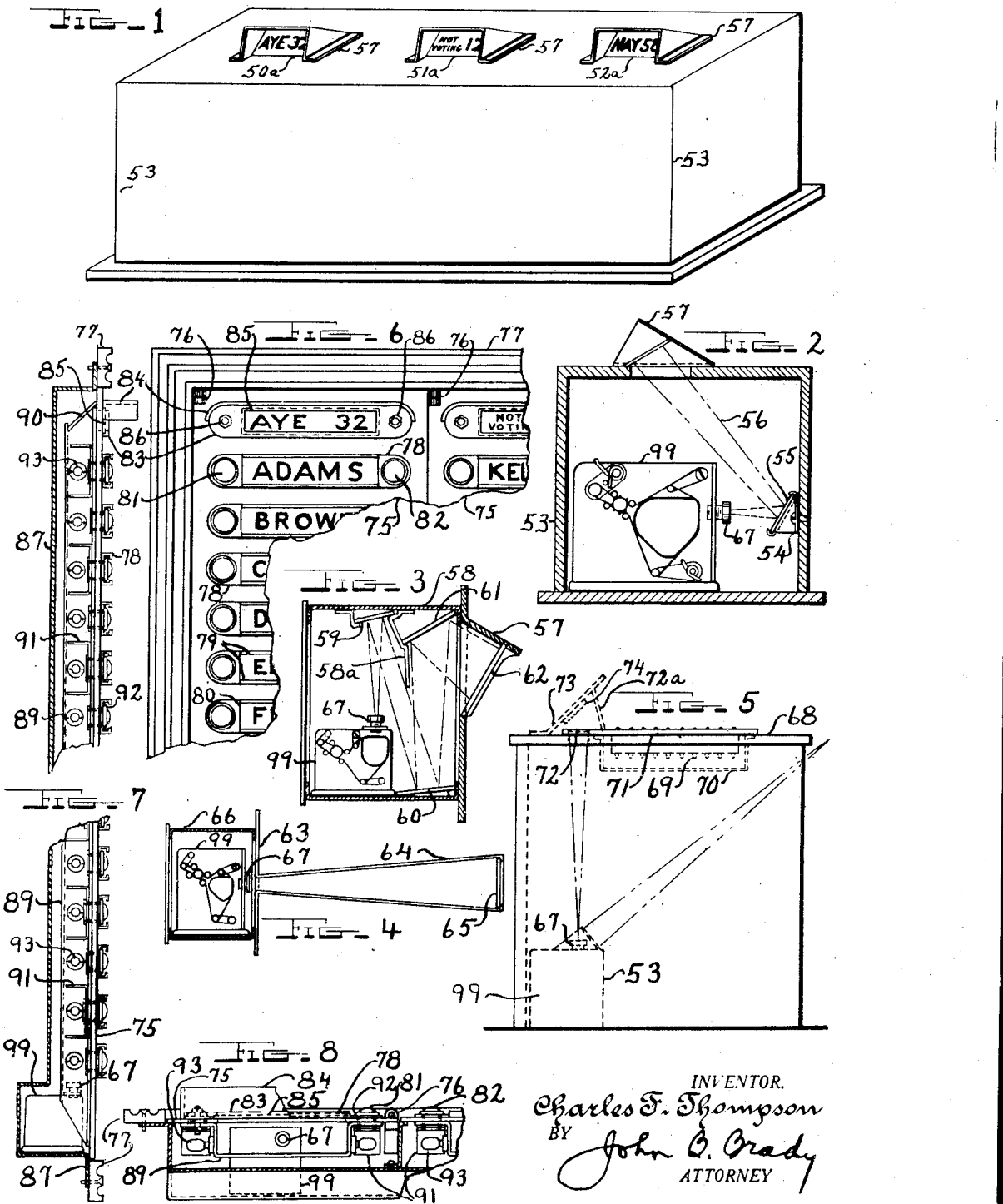

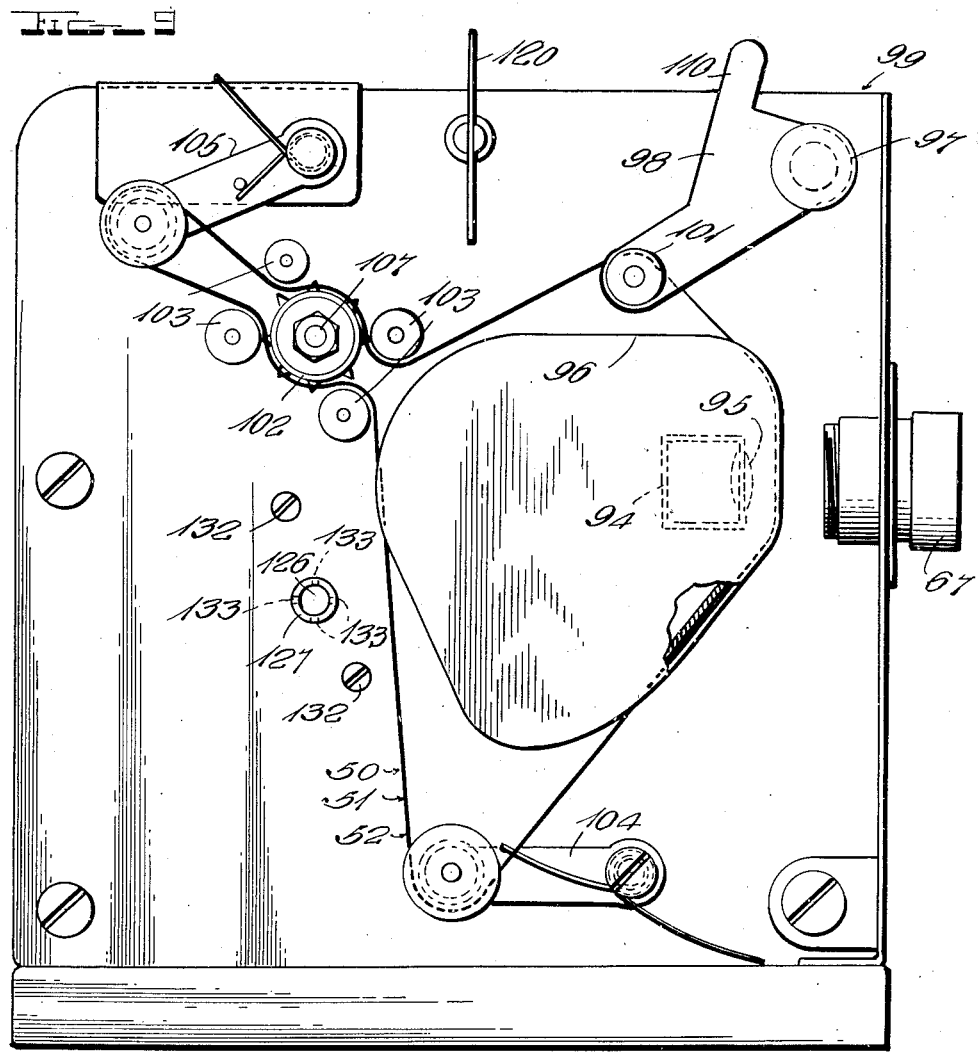

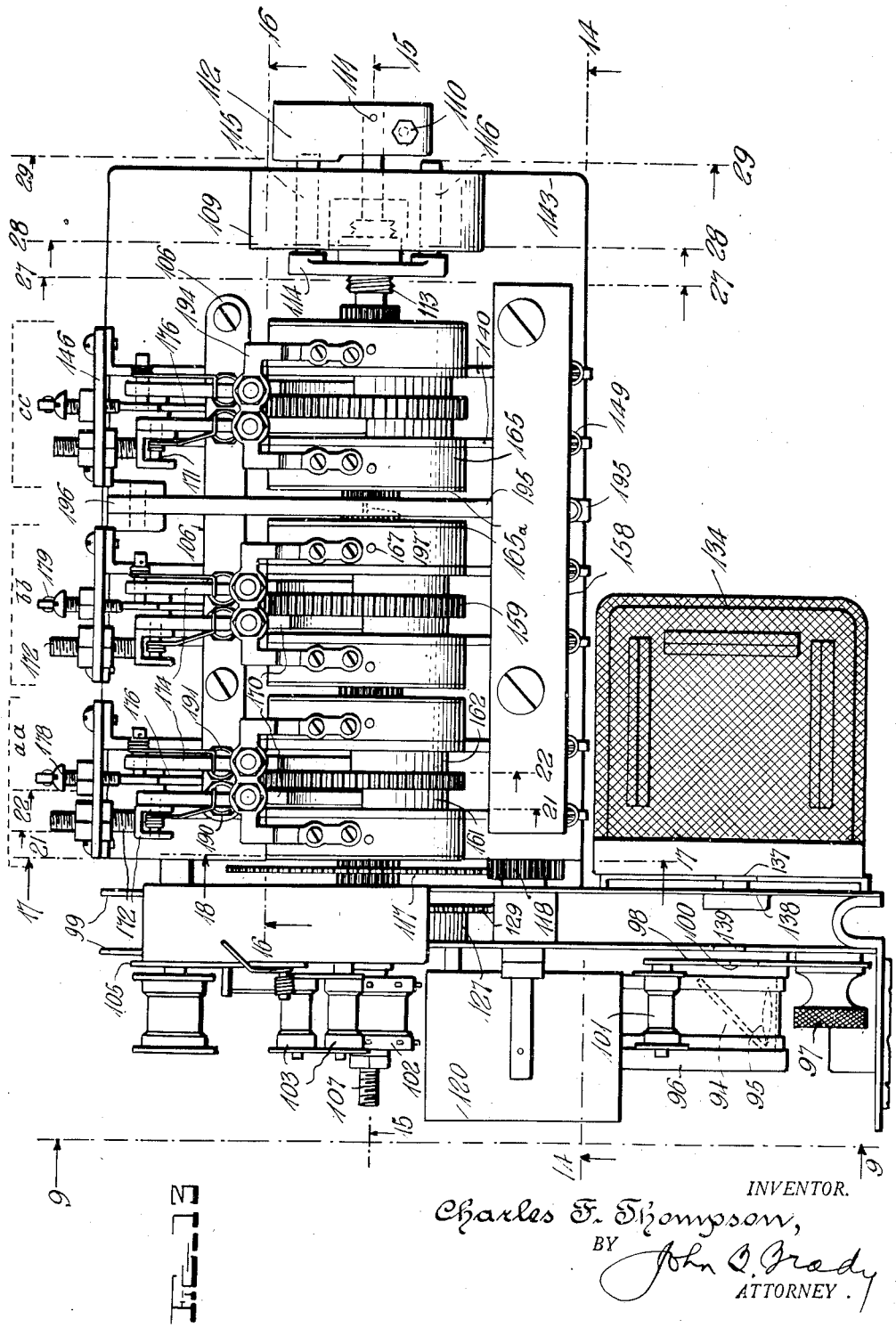

Jan. 9, 1940.  C. F. THOMPSON  2,186,049
OPTICAL PROJECTING MECHANISM
Original Filed July 31, 1936    10 Sheets-Sheet 4
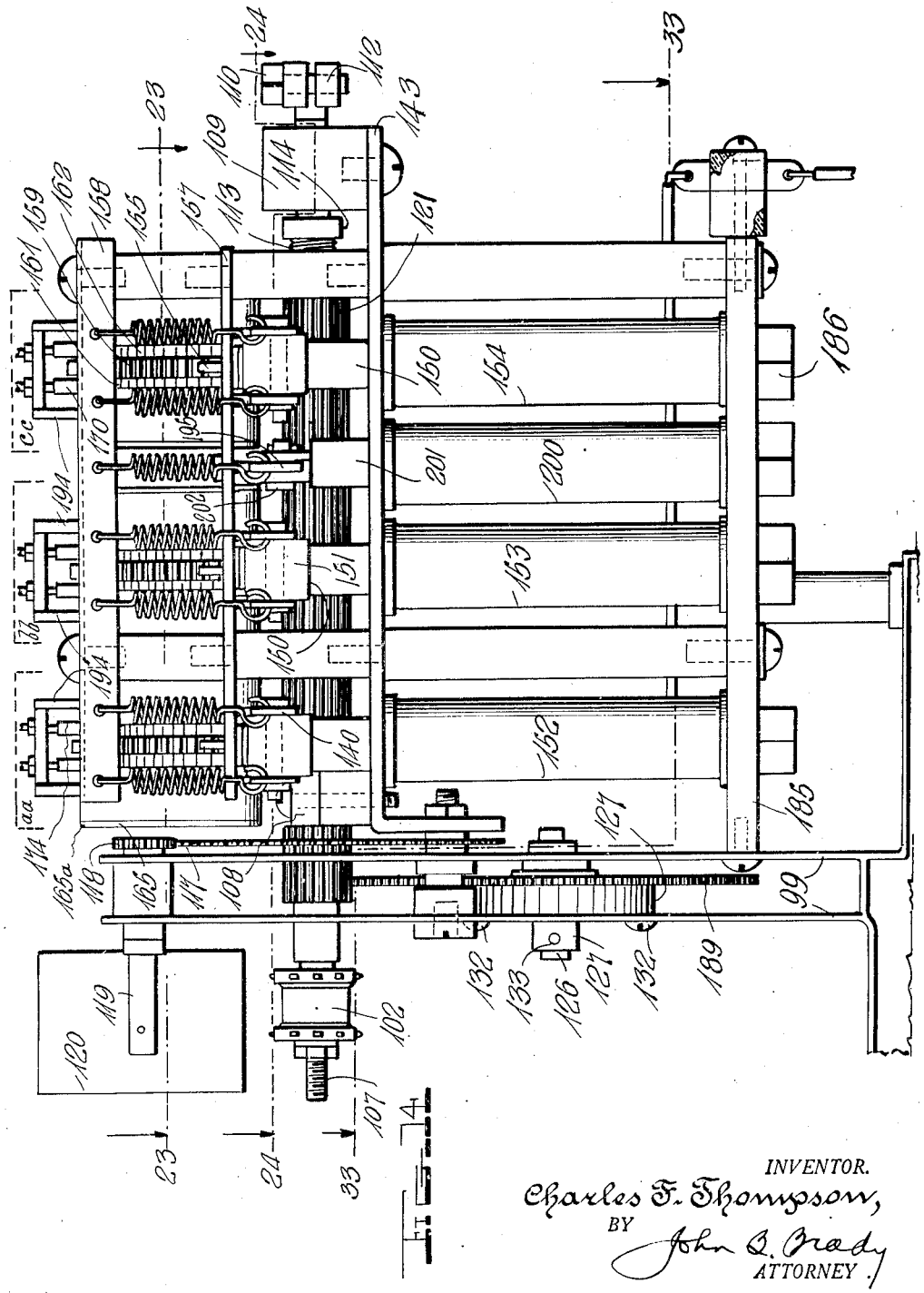
INVENTOR.
Charles F. Thompson,
BY
John D. Brady
ATTORNEY.

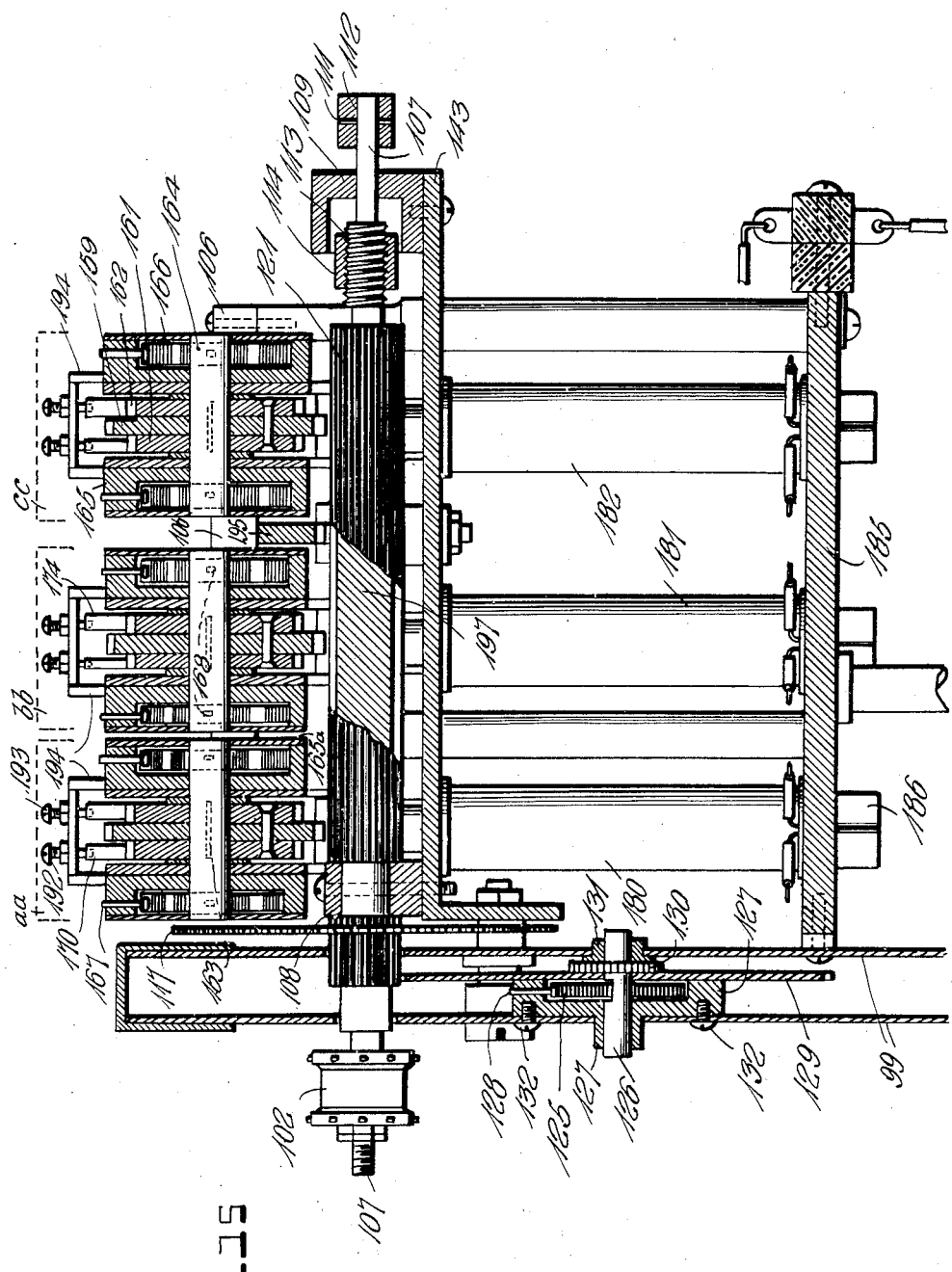

Jan. 9, 1940.   C. F. THOMPSON   2,186,049
OPTICAL PROJECTING MECHANISM
Original Filed July 31, 1936   10 Sheets-Sheet 6
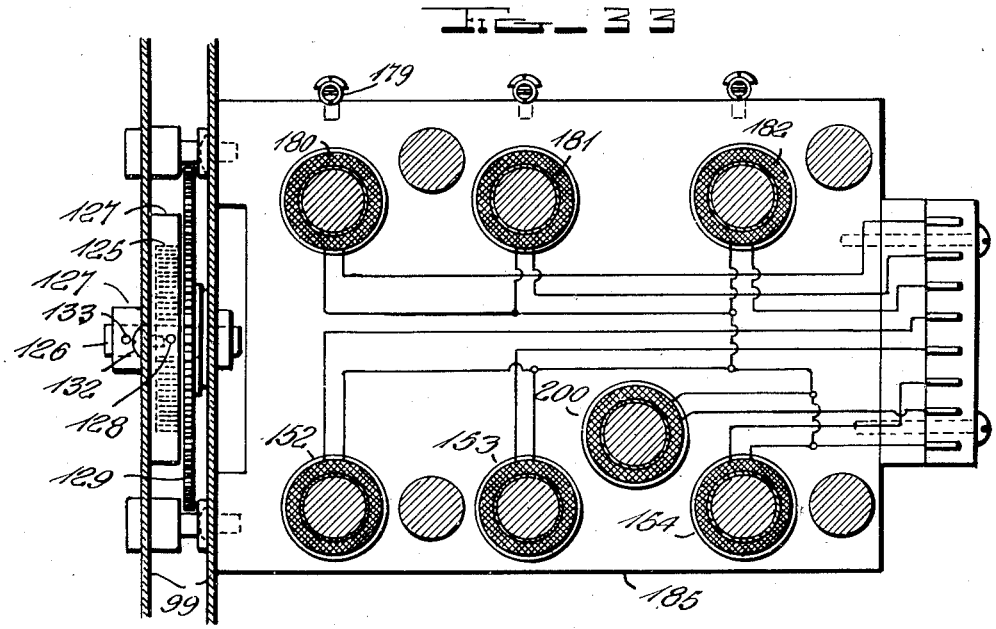
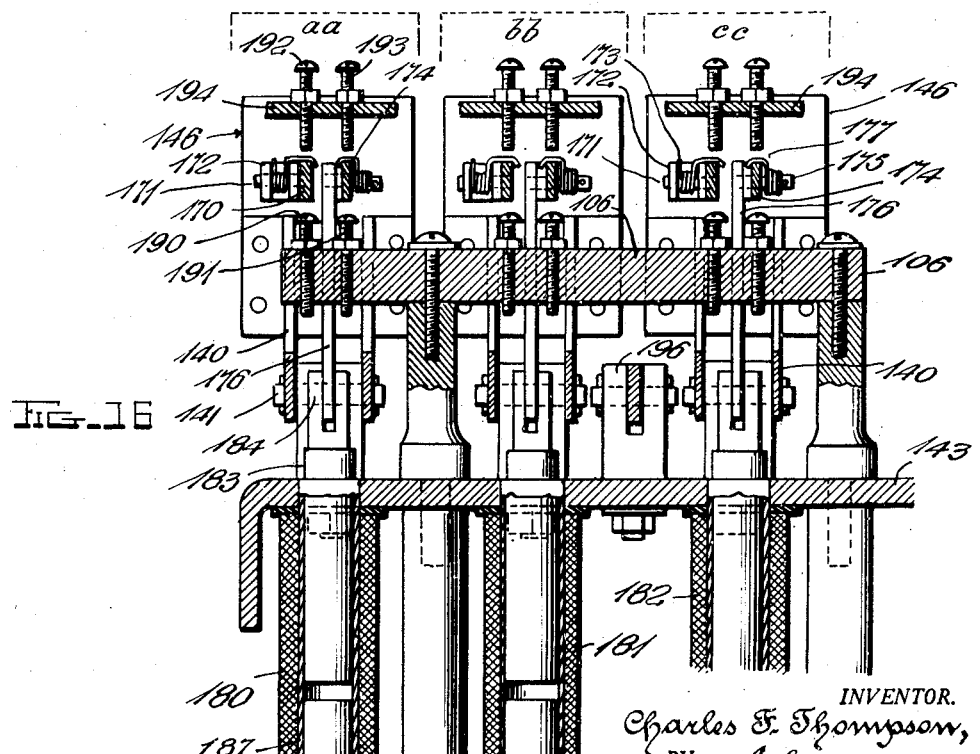
INVENTOR.
Charles F. Thompson,
BY John B. Brady
ATTORNEY.

Jan. 9, 1940.   C. F. THOMPSON   2,186,049
OPTICAL PROJECTING MECHANISM
Original Filed July 31, 1936    10 Sheets-Sheet 7
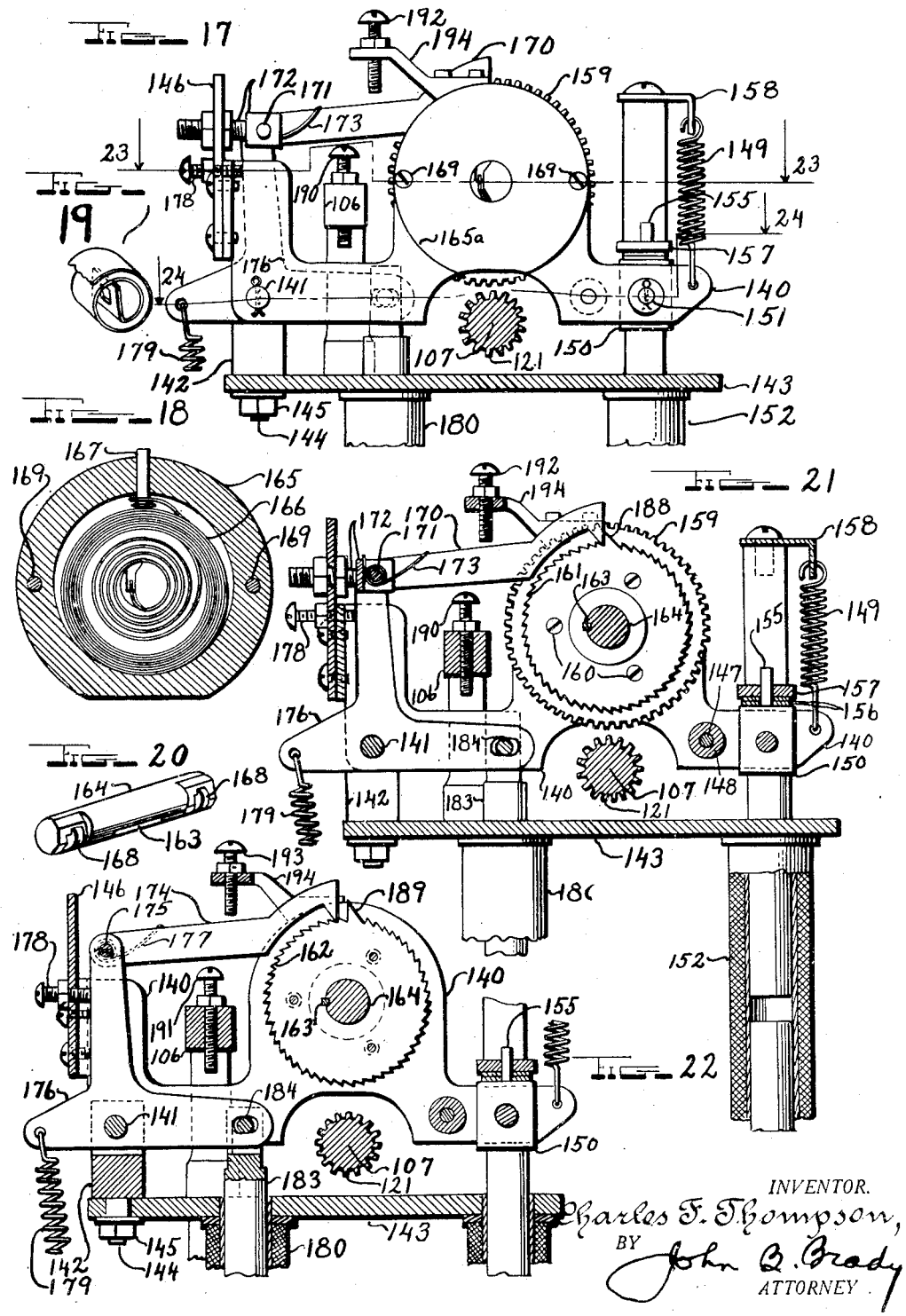
INVENTOR.
Charles F. Thompson,
BY John B. Brady
ATTORNEY Jan. 9, 1940.   C. F. THOMPSON   2,186,049
OPTICAL PROJECTING MECHANISM
Original Filed July 31, 1936   10 Sheets-Sheet 8
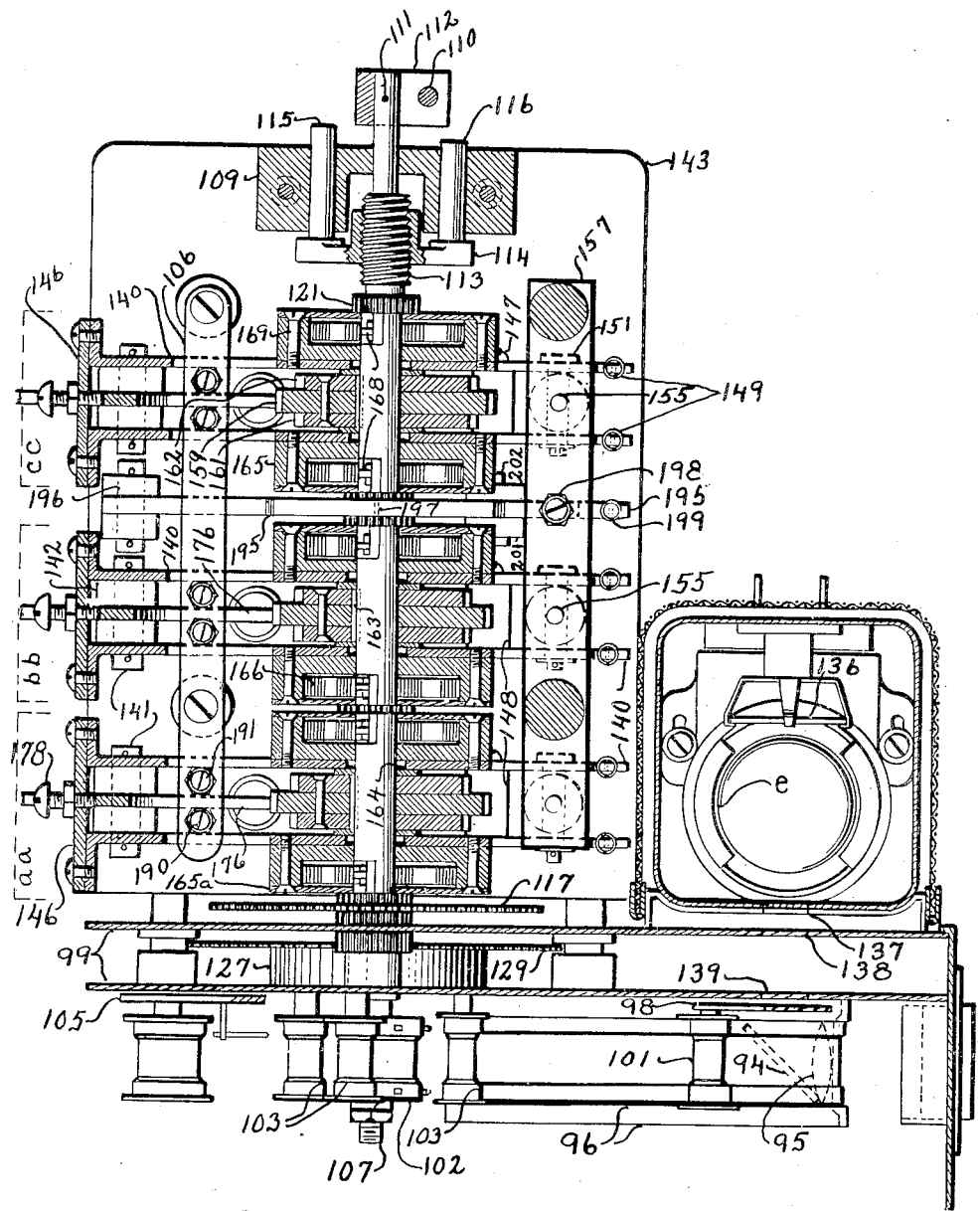
INVENTOR.
Charles F. Thompson,
BY John Q. Brady
ATTORNEY.

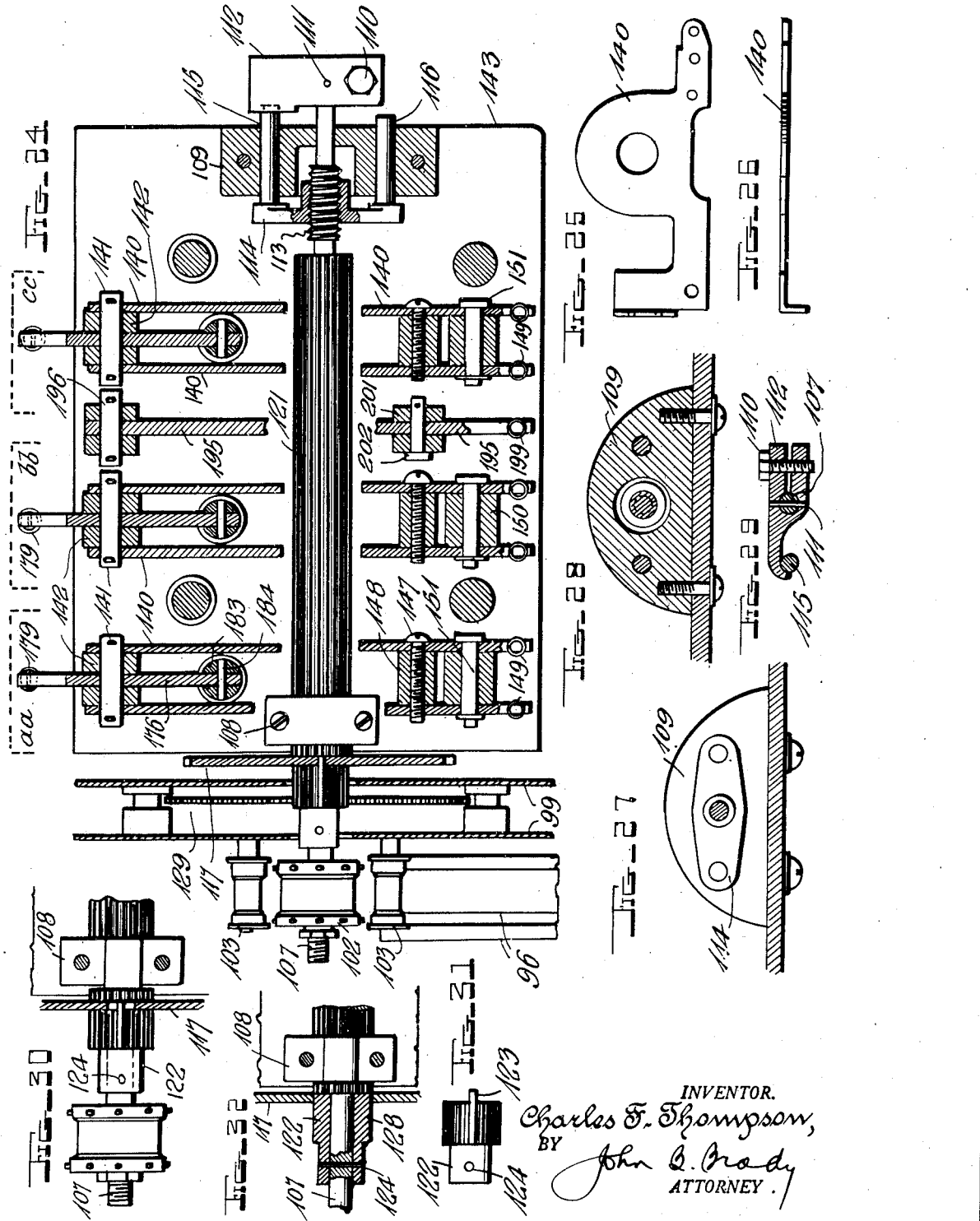

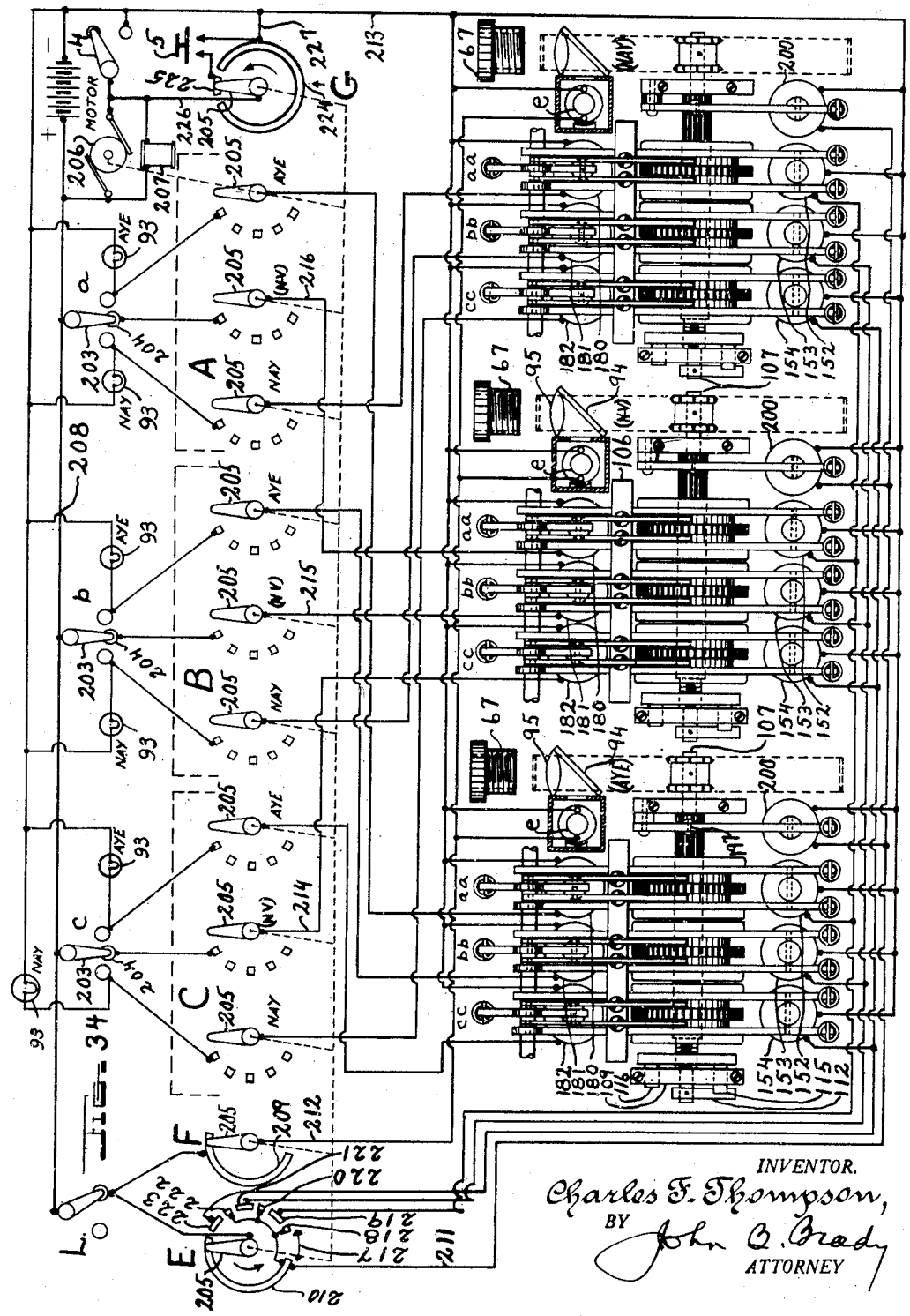

Patented Jan. 9, 1940

2,186,049

UNITED STATES PATENT OFFICE 2,186,049

OPTICAL PROJECTING MECHANISM

Charles F. Thompson, Richmond, Va.

Original application July 31, 1936, Serial No. 93,684. Divided and this application May 19, 1937, Serial No. 143,578

5 Claims. (Cl. 88—24)

This application is a division of an application filed July 31, 1936, bearing Serial No. 93,684, and disclosing a visual indicator mechanism for electrical roll call or voting apparatus.

In my application bearing Serial No. 93,684 I described a vote totalizer, which I call a Votometer, especially designed to operate at high speed, and adapted to display on a screen to the members, a continuous succession of vote totals while the members were voting, as well as to make the usual final totalization after the members had finished voting.

This application is directed to a mechanism for the projection of totals upon a screen utilizing a mechanism for totalization which is claimed in application Serial No. 93,684.

I do not limit myself to the precise combination of totaling and projecting mechanism illustrated. It is apparent I can modify my totalization apparatus and use the modification with the projection means described, and it is likewise apparent that with the totalization apparatus described, I can modify my projection mechanism.

Application Serial No. 93,684, of which this is a division, is one application of a series of applications relating to Electrical roll call or voting systems. Other applications heretofore filed in this series are Serial No. 77,039 filed April 29, 1936; Serial No. 77,839 filed May 4, 1936; Serial No. 83,334 filed June 3, 1936, and Serial No. 87,273 filed June 25, 1936.

One of the objects of my invention is to provide an optical means for projecting on a screen certain indicia in which consecutive numbers may be displayed on the screen and the projection thereof controlled in time relation to the movement of the indicia to be displayed.

Another object of my invention is to provide an optical means for projecting on a screen certain indicia by which individual successively displayed numbers and integrations of such numbers may be read from the same apparatus.

A further object of my invention is to provide an optical means for displaying consecutive numbers on a screen at relatively high speed.

Still another object of my invention is to provide an optical means for projecting certain indicia on a screen in which the total of a number of successive readings may be projected while another total is being prepared for projection.

Other and further objects of my invention reside in the construction of an optical means for projecting indicia relating to votes on a screen as set forth more fully in the specification hereinafter following by reference to the accompanying drawings in which:

Figure 1 shows a votometer for registering three classes of votes; Fig. 2 indicates a side sectional view of the votometer, showing the use of a mirror to lengthen the light beam and increase the size of the display; Fig. 3 shows a wall box mounting for my votometer in which a system of mirrors is used to obtain large magnification within a small space, the projecting lens in this case is arranged vertically; Fig. 4 shows a wall box mounting for my votometer without the use of a mirror, in which a long enclosed light-horn is provided; Fig. 5 shows how the votometer may be placed in or under the presiding officer's desk and display the totals to him; Fig. 6 represents the front view of an indicator board equipped with the votometer; Fig. 7 represents a side sectional view of same; Fig. 8 represents a top sectional view of same; Fig. 9 shows a side elevation of the votometer on lines 9—9 of Fig. 13; Fig. 10 shows the film for displaying the aye totals; Fig. 11 shows the film for displaying the nay totals; Fig. 12 shows the not-voting film; Fig. 13 is a top view of the votometer unit; Fig. 14 is a view on lines 14—14 of Fig. 13; Fig. 15 is a sectional view on lines 15—15 of Fig. 13; Fig. 16 is a view on lines 16—16 of Fig. 13; Fig. 17 is a view on lines 17—17 of Fig. 13 and shows one of the several storage units; Fig. 18 is a view of one of the storage unit operating springs, with its housing; Fig. 19 shows the inner end of spring illustrated in Fig. 18; Fig. 20 illustrates one of the storage unit shafts; Fig. 21 is a view on lines 21—21 of Fig. 13, and shows one of the storage units drawn with the frame member indicated in Fig. 25 omitted, allowing clear view of the holding pawl and its ratchet wheel; Fig. 22 is a view on lines 22—22 of Fig. 13, and shows one of the storage units drawn with the gear and holding pawl and ratchet wheel omitted, allowing clear view of the operating pawl and ratchet wheel, and the magnet controlling them; Fig. 23 is a sectional view of the mechanism on lines 23—23 of Figs. 14 and 17; Fig. 24 is a sectional view of the mechanism on lines 24—24 of Figs. 14 and 17; Fig. 25 represents one of the two frame members supporting each storage unit; Fig. 26 is a top view of Fig. 25; Fig. 27 is a view on lines 27—27 of Fig. 13; showing the bearing supporting one end of the main drive shaft, with the retractible stopping pin mechanism in evidence; Fig. 28 is a view on lines 28—28 of Fig. 13, showing in sectional form the bearing block mechanism illustrated in Fig. 27; Fig. 29 is a view showing in sectional form the main shaft stopping arm and retractible stopping pin, taken on lines 29—29 of Fig. 13; Fig. 30 is a view of the bearing supporting the other end of the main drive shaft, and illustrates the mechanism on that end of the drive shaft; Fig. 31 shows the pinion sleeve that was illustrated in Fig. 30, by itself; Fig. 32 shows in a sectional manner the method of mounting the pinion sleeve of Fig. 31 on the main drive shaft; Fig. 33 shows on lines 33—33 of Fig. 14, the spring and gear mechanism used for returning the main drive shaft to its normal position, and the various solenoid magnets, in sectional form, wired to a terminal block; and Fig. 34 discloses a wiring diagram.

Similar numerals refer to similar parts throughout the several views.

The votometer usually consists of three units or sections, for registering the aye, not-voting and nay votes, although it may be built to contain as many sections as there are different classes of votes to be recorded.

Each unit or section of the votometer consists of a projecting machine, in one adaption of my invention, such as shown generally in Fig. 9, in which a continuous film such as 50, or 51, or 52, or some equivalent thereof such as a glass disc or drum containing consecutive vote numbers, is rapidly moved or rotated from one position to another, to display the totals. In Fig. 1 three such units or sections are placed within a single box 53, and their vote totals are displayed on the screens 50a, 51a, and 52a. A side view in section form of this arrangement is illustrated in Fig. 2, wherein bracket 54 holds the mirror 55 in position to reflect the beam 56 to its associated screen. Light guard 57 protects the image from overhead light.

In Fig. 3 a mounting is shown, desirable when a larger image is required. Steel wall box 58 contains a system of mirrors 59, 60 and 61, for enlarging the beam within a small space, and reflecting it to screen 62 under visor 57. Bracket 58a acts as a shield for separating the light beams besides supporting mirrors 59 and 61, and it will be seen that the projecting lenses are mounted vertically.

Projection may be secured without mirrors, as shown in Fig. 4, by attaching a front plate 63, holding light-horn 64 and screen 65, to steel box 66.

The assembly illustrated in Fig. 1 may be placed on the floor under the presiding officer's desk, as shown in Fig. 5, if he alone is to read the results. Or by using vertical lens such as indicated at 67 of Fig. 5, the image may be projected on miniature screens on top of the presiding officer's desk 68. If a miniature indicator board is used on the presiding officer's desk, which is usually made by assembling telephone lamp jack strips 69 in a steel box 70 under brass trim 71, the brass trim may be arranged to accommodate the small screens indicated at 72, thereby combining the totaling and indicating mechanisms in a single unit. Of course the screens 72 may be mounted separately from the indicator board 69, 70, 71, if so desired. Furthermore screens 72 of Fig. 5 may be equipped with visor 73, and if it is desired visor 73 may be equipped with mirror 74, and screens 72a may be substituted for screens 72, thus reflecting the light-beam to the presiding officer.

Instead of displaying the results to the members by separate totalizer units such as shown in Figs. 2, 3 and 4, the principle of displaying the totals on the indicator board as disclosed in Fig. 5, may likewise be applied to the large size indicator boards. Fig. 6 discloses a front view of a large indicator board containing votometer units. The doors, such as 75, are hinged to the frame as indicated at 76, within the metallic trim 77. Each door has attached to it a series of card slots 78 having flanges 79 holding cards 80. Each card slot 78 is attached to the door by aye lamp-cap 81 and nay lamp-cap 82. Somewhat matching the card slots 78, the screen holder 83 with its visor 84, and holding screen 85, is bolted at 86, to each desired door 75.

Fig. 7 gives a side view and Fig. 8 gives a top view of the indicator board and total display mechanism shown in Fig. 6. The trim 77 is fastened to steel wall box 87 which contains a votometer projecting unit 99 with vertical lenses 67 behind each desired door 75.

In a structure such as shown in Figs. 6, 7, and 8, provision must be made to isolate the light of each lamp so it can shine only through its own lamp-cap; and provision must likewise be made to isolate the totalizing beam arising from each projecting lens unit 67. This is accomplished by attaching to the rear of each door 75 a channel member 89, which separates the rows of aye and nay lamps, and isolates the totalizing beam. The top of each channel member 89 is fitted with a mirror 90 for reflecting the beam to screen 85. Bent metal light shields 91 are attached by every or every other lamp-cap such as 82. Glass lamp-caps such as 81 and 82 may be fitted with spun metal holders, such as shown at 92, which will serve to fasten card slots 78, channel member 89 and bent metal light shields, to door 75.

Of course channel member 89 could be fastened to steel box 87 instead of door 75, which would equally well isolate beams from projecting lens 67, but that construction would take away from door 75 the desirable reinforcement strength found in channel 89. The indicator board lamps 93 may be fastened either to box 87 or to channel member 89 as shown.

Before discussing the mechanical action of the votometer let us refer to Fig. 9. An aperture covered by a mirror set at forty-five degrees to the frame is indicated at 94, permitting light from the projection lamp on the far side of the machine to pass through condensing lens 95 and film 50 or 51 or 52, and projecting lenses 67, to whatever type or screen may be used. A film track and lens housing indicated at 96, guides the film through its proper path between the lenses.

Adjustment for centering the image on the screen is provided by thumb screw 97, which holds lever 98 in any adjusted position, to frame 99. By loosening thumb screw 97, handle 100 of lever 98 may be moved and locked as desired, causing lever roller 101 to move film up or down.

The usual sprocket wheel and rollers for actuating the film are found at 102 and 103 respectively, and the usual spring arm rollers for putting light tension on the film, are indicated on both sides of the sprocket wheel, at 104 and 105 respectively. Shown at 120 is a governor, in this case in the form of an air paddle wheel, which rapidly rotates when the film is in motion, and controls the speed of film movement.

The sprocket wheel 102 is capable of quickly moving the film to the desired display number, or restoring it to the zero or normal position. With the three-storage-unit votometer illustrated, the film or equivalent is moved to the desired display number in not more than three movements, and is restored to normal or zero in one movement. The mechanism for accompanying this will be described.

A totalizing shaft 107 runs entirely through the votometer, as shown in Figs. 14, 15 and 24, and is supported by bearings 108 and 109. Bolted and pinned to one end of shaft 107 at 110 and 111 is a stop arm 112 which revolves with shaft 107, as shown in Fig. 29. A portion of the shaft 107 adjacent to bearing 109, is threaded at 113, and a travelling nut 114 is engaged with these threads, and moves stop pin 115 attached thereto, out of path of stop arm 112, when shaft 107 commences to rotate to set up a total. Steadying pin 116 is also attached to nut 114 and moves through bearing 109 as stop pin 115 does, when shaft 107 rotates, but steadying pin 116 does not act as a stop.

Except for the small portion of the shaft 107 that is shown threaded at 113, all the rest of the shaft 107 that lays between the bearing blocks 108 and 109, contains gear teeth in the nature of a pinion rod, as indicated at 121 in Figs. 15 and 24.

Fastened to shaft 107 is the gear wheel 117, best seen in Fig. 14, which drives pinion 118 on governor shaft 119 that supports paddle 120. Film breakage and excessive wear is overcome by using a governor. Gear wheel 117 is fitted with a double keyway to match the end keys 123 on pinion sleeve 122 shown in Fig. 31. Figs. 30 and 32 show how gear wheel 117 and pinion sleeve 122 are both attached by pin 124 on turned shoulder of shaft 107.

A spring of the clock spring type shown at 125 in Fig. 15, having its inner end pinned to stub shaft 126, and its outer end pinned to housing 127, at 128, furnishes power to gear wheel 129, through shaft flange 130 to which it is pinned, for restoring shaft 107 to its normal position after each display of a total. A spring housing 127 forms a bearing for one end of shaft 126, and the other end of shaft 126 is supported by bearing 131. Spring 125 may be adjusted for a stronger or weaker tension by removing screws 132, turning the housing 127 until the desired tension is attained, and then replacing the screws 132. In Fig. 9 the shoulder of spring housing 127 is shown projecting through frame 99, and the four holes indicated in Fig. 9 at 133 are designed to receive a special tool for rotating spring housing 127 when screws 132 are removed for adjustment.

In Figs. 10, 11 and 12 it will be observed that two numbers are applied to each frame in the film, and one set of sprocket holes is used for each frame. In Fig. 9 it will be seen that sprocket wheel 102 possesses eight teeth, and hence moves the film sixteen counts per revolution. In Figs. 17, 21 and 22 it will be seen that the pinion toothed portion 121 of shaft 107 is equipped with sixteen teeth. This means each time shaft 107 is rotated the distance of one tooth a new number is displayed.

In Fig. 13 the cover or housing for the projecting lamp is indicated at 134, and in Fig. 23, which is drawn in section, the projection lamp is shown at e, the reflector at 136, apertures for passing the beam at 137, 138 and 139. The beam then strikes reflecting mirror and condensing lens combination 94 and 95, and passes through film 50 or 51 or 52, and projecting lens 67 to the screen used, as previously outlined.

Spring 125 causes a stop arm 112 to abut stop pin 115 when shaft 107 is in its normal or zero registering position; which means spring 125 is wound up when totalizing shaft 107 is rotated for registering a total. Spring 125 is capable of permitting shaft 107 to rotate against its pressure for several revolutions, and then spring 125 is capable of driving totalizing shaft 107 back to its normal or zero registering position where stop arm 112 abuts stop pin 115. Stop pin 115 is withdrawn from the path of stop arm 112, by nut 114 during the first revolution of shaft 107, and stop pin 115 returns into the path of stop arm 112 only after spring 125 has driven shaft 107 back to a position within one revolution of its normal position. Thus shaft 107 can rotate several revolutions from its normal position, moving the film the full length of the number track, and then shaft 107 can be returned to its normal position by action of spring 125, which restores the film to its zero indicating position.

The balance of the mechanism for each votometer unit consists of a number of devices called storage units, each capable of rotating shaft 107, within certain limits, against action of spring 125; and a magnetically operated locking and centering bar for holding shaft 107 in the advanced or vote registering positions against action of spring 125.

In the present application the votometer described possesses three storage units, although any desired number of storage units may be used. These three storage units are indicated at aa, bb, and cc, in Figs. 13, 14, 15, 23, and 24. These three storage units are identical mechanically, and only one of them needs description.

In Fig. 13 section lines 17, 21 and 22, and Figs. 17, 21 and 22 corresponding thereto, illustrate a side view of a storage unit. The storage unit is built upon two frame members, one of which is shown at 140 in Figs. 25 and 26. The other frame member is similar thereto except the ear is bent in the opposite direction. These two frame members are shown in Figs. 23 and 24, as well as in Figs. 17, 21 and 22, to be pivoted on a short shaft 141, mounted in bearing block 142. Each bearing block 142 is attached to frame plate 143 by shank 144 and nut 145. The two frame members 140 of each storage unit, besides being pivoted at 141, are joined together by a screwed on back plate 146, and by a screw and bushing best illustrated at 147 and 148 in Fig. 24. This frame work of each storage unit is normally held up by springs 149, which are attached to plate 158, but this frame work is capable of being pulled downwards by the square headed solenoid plunger 150, pivoted between the frame members 140 by pin 151, when its respective solenoid 152 or 153 or 154 is energized. The square headed plungers 150 are equipped with shanks 155, upon which are held silencing washers 156, which deaden the noise when square heads of plungers 150 are returned to their normal position, determined by stop plate 157.

The frame work just described for each storage unit, contains as its principal operating element, as best shown in Figs. 17, 21 and 22, a gear wheel 159, to either side of which is attached by screws or rivets 160, a ratchet wheel 161 and 162. This gear and double ratchet combination is keyed at 163 to shaft 164. The shaft 164 also contains at each end, as shown in Fig. 20, a milled spring hook 168. Two spring housings, such as illustrated at 165 in Fig. 18, each containing a clock spring 166, having its outer end pinned to its respective housing at 167, and the two inner ends held to shaft 164 by the hooks 168, are attached to frame members 140 by screws indicated at 169. A plate 165a for enclosing the spring 166 is placed under the screw heads 169 on each housing 165. The two housings 165 furnish the bearings for shaft 164, in addition to containing the springs 166 that furnish the power for returning shaft 164 with the gear and ratchet wheel combination keyed thereon, back to its normal position. And when storage unit shaft 164 is restored to its normal position by springs 166, the gear is in mesh with shaft 107, and advances the film. During advancement of the film by resetting of storage unit, the two springs 166 are, in unwinding, causing main shaft spring 125 to become wound, aided by a favorable gear ratio for this purpose.

Two pawls are provided for each storage unit, the near pawl 170 illustrated in Figs. 17 and 21, acts as a holding pawl, and is pivoted at 171 to an adjustable bolt 172, attached to the back plate 146. Spring 173 holds pawl 170 in contact with ratchet wheel 161.

Directly behind the holding pawl 170 just described is the operating pawl 174, best illustrated in Fig. 22. Pawl 174 is pivoted at 175 to operating lever 176, and held in contact with its respective ratchet wheel 162 by spring 177. The operating level 176 is pivoted on the same shaft 141 that pivots the two frame members 140, and normally is held against adjustable stop screw 178 by spring 179. Operating levers such as 176 have pinned to them at 184 solenoid plungers such as 183, and are actuated by solenoids such as 180 or 181 or 182. The stationary cores of all solenoids used on the votometer, including cores 187 of solenoids 180, 181 and 182 are threaded into base plate 185 and locked by a nut such as 186, which provides for adjustment.

The adjustable core 187 of each storage unit and the adjustable stop screw 178 thereof, provide the necessary adjustable stops for the proper movement of operating pawl 174. These stops are adjusted so operation of solenoid 180 or 181 or 182 will move the ratchet and gear wheel combination connected therewith, against the action of the two springs 166 connected thereto, for the distance of one gear or ratchet tooth, whereupon it is caught and held by the holding pawl 170. Both ratchet wheels 161 and 162 have the same number of teeth, and each small tooth thereon corresponds to a gear tooth on the gear wheel 159.

It will be seen that each ratchet wheel 161 and 162 possesses a long tooth, 188 and 189 respectively.

After solenoid plunger 183 of each storage unit has by its repeated operation advanced the ratchet and gear wheel combination 159, 160, 161 and 162 connected therewith, one step or tooth forward for each actuation, and after this operation has been completed in all storage units, the gear wheels 159 are consecutively brought into mesh with main shaft 107, by movement of each plunger 150, as solenoids 152, 153 and 154 are consecutively energized.

As each storage unit is pulled downward by its respective solenoid 152, 153 and 154, the pawls on it 170 and 174, strike adjustable throw-out screws 190 and 191, mounted upon bar 106, and by the time the gears are fully meshed, pawls 170 and 174 have been lifted clear of the small teeth on their respective ratchet wheels, which allows the gear and ratchet wheel combination to be reset or restored to its normal position wherein long tooth 188 contacts pawl 170, by power generated through unwinding of the two springs 166. Stop screws 192 and 193, mounted on bracket 194, prevent pawls 170 and 174 from being lifted clear of the long teeth 188 and 189.

Since each gear 159 is, in its respective consecutive order, in mesh with teeth 121 on main shaft 107, at the time it is reset or restored, the power generated through unwinding of the two springs 166, likewise rotates the main shaft 107, and correspondingly advances the film.

As main shaft 107 is so moved, to so advance the film, spring tension is built up in spring 125, which would immediately restore shaft 107 to its original position, if a locking and centering lever were not provided. This lever is shown at 195 in Figs. 13, 15, 23 and 24. It is pivoted at 196, possesses a single tooth 197 engageable with toothed portion 121 of main shaft 107, and is normally held against adjustable stop screw 198 by spring 199. Solenoid 200 is capable of locking and centering main shaft 107 in any position, when movement of its plunger 201, pinned at 202 to locking and centering lever 195, causes single tooth 197 to engage with toothed portion 121 of main shaft 107.

Each locking lever 195 is actuated by its solenoid 200 to lock and center the main shaft 107 between forward movements of the film caused by successive resetting of the storage units; and also to lock and center the main shaft 107 for display of the final total. De-energization of solenoid 200 permits the film to reset by action of spring 125 revolving shaft 107 until stop arm 112 strikes stop pin 115.

In Fig. 34 a wiring diagram is shown illustrating operation. The mechanical details of the structure shown in Fig. 34 are not intended to represent an actual construction, but merely to present a general view of the operating functions in connection with the wiring diagram.

The votometer is controlled by a device termed a selector, covered by an application filed June 3, 1936. The complete wiring of the votometer and the selector is disclosed in my application on the system itself filed May 4, 1936. In Fig. 34 herein, the selector and wiring, as well as the member's voting units, are sufficiently illustrated to describe the operation of the votometer, but the other applications may be referred to if so desired.

Three voting units are indicated at a, b and c. Voting unit a is in the first voting division and connected to the first contactors in division A of the selector, and divison A of the selector controls the first storage units, aa, aa, and aa, respectively, of the aye, not-voting and nay sections of the votometer. Voting unit b is in the second voting division, and connected to the first contactors in division B of the selector, and division B of the selector controls the second units, bb, bb and bb, of the three said votometer sections. Voting unit c is in the third voting division, and connected to the first contactors in division C of the selector, and division C of the selector controls the third storage units, cc, cc, and cc, of the three said votometer sections.

The voting units a, b, and c are connected to positive battery with their respective blades 203 resting on not-voting contactors 204, and, as drawn, will operate the storage units of the middle or not-voting section of the votometer. If blades 203 were thrown to the right, they would operate the storage units of the left or aye section of the votometer. If thrown to the left, they would operate the storage units of the right or nay section of the votometer. But in all cases operation of the votometer storage units would accur only while the selector wipers 205 were revolving and thereby completing the circuits to the voting units *a, b,* and *c,* etc.

All selector wipers 205 are arranged to move together. Those in selector divisions A, B and C control the simultaneous storing of impulses from three groups or divisions of members. Wiper 205 in selector section E controls the storage unit reset and film advancing solenoids 152, 153 and 154, and the locking and centering solenoid 200, in each section of the votometer, while the wiper 205 in selector section F controls the projection lamp *e* in each section of the votometer. Wiper 205 in selector section G controls operation of the selector driving motor 206 and its brake release solenoid 207.

When a vote is to be taken switch L is closed, as drawn, whereupon current from positive conductor 208 passes through switch L to wiper 205 of selector section E, and to contactor 209 of selector section F. From selector section E current on contactor 210 passes over conductor 211 to the three locking and centering solenoids 200; and current from wiper 205 of selector section F passes over conductor 212 to the three projecting lamps *e*; and since lamps *e* and solenoids 200 are connected to negative conductor 213, all three projecting lenses 67 display zero totals from films locked and centered in that position, as the members commence to vote.

For continuous totalization while the members are voting, presiding officer's switch 4 is closed, which energizes brake release solenoid 207 and operates selector motor 206, so the wipers revolve continuously. As drawn, current from conductor 208, and through the three contactors 204, reaches the first contactor in the N—V or not-voting series of contactors, in each selector division A, B and C. As the wipers 205 in selector divisions A, B, and C wipe the first contactors in their respective paths, current proceeds over conductors 214, 215 and 216, to simultaneously energize solenoids 180, 181, and 182 in the center or not-voting section of this votometer. Thereafter the solenoids 180, 181 and 182, of all three sections of the votometer, receive further operating impulses from other voting units, through further rotation of wipers 205 in selector divisions A, B, and C, as said wipers pass over other energized contactors in their paths. With a selector of three divisions, such as drawn, three impulses are always simultaneously stored, and then three more, etc., etc. It happens that with the three voting units *a, b,* and *c* drawn in the not-voting position, all storing solenoids in the not-voting section of the votometer would be simultaneously operated as wipers 205 contacted the first contacts in their paths, but if voting unit switches *a, b* and *c* had been in three different positions, one storing solenoid in each of the three sections of the votometer would have been simultaneously energized.

When the wipers 205 have completed approximately half a cycle, those in selector sections E and F leave contactors 210 and 209. The projection lamps *e* are immediately extinguished, and the locking and centering solenoids 200 are released. While wiper 205 of selector section E passes through open space 217 and the solenoids 200 are de-energized, nothing happens if the films had been registering zero totals, but if the films had been registering votes they would have been reset to the zero position, as locking and centering levers 195 released their respective main shafts 107.

As selector section E wiper 205 further advances after allowing the films to be set, successive contact is established with contactors 218, 219, 220, 221, 222, 223, and 210, and in each case the wiper establishes the new contact before breaking the old contact, so the locking and centering levers 195 cannot release their main shafts 107 while the films are being stepped into their new positions. At 218 solenoids 200 lock all main shafts 107 in the normal or zero registering position. At 219 all three 152 solenoids are operated, which permits all three *aa* storage units to engage their respective 107 shafts and move their respective films forward sufficiently to register the votes controlled by selector division A. At 220 solenoids 200 lock all main shafts 107 with selector division A totals registered. At 221 all three 153 solenoids are operated, which permits all three *bb* storage units to engage their respective shafts 107 and move their respective films sufficiently to register the additional votes controlled by selector division B. At 222 solenoids 200 lock all main shafts 107 with selector division A and B totals registered. At 223 all three 154 solenoids are operated, which permits all three *cc* storage units to engage their respective shafts 107 and move their respective films forward sufficiently to register the additional votes controlled by selector division C. At 210 solenoids 200 lock all main shafts 107 with selector A, B and C totals, or the final totals registered; and at this time wiper 205 of selector section F establishes contact with contactor 209, lighting all three projection lamps *e* to display the totals.

With continuous totalization this cycle is continuously repeated; new totals being stored while old totals are being displayed; and the old totals being released as selector section E wiper 205 passes through space 217. Switch 4, which is closed to secure continuous totalization, could be opened in the middle of a selector cycle, but nevertheless all wipers 205 would continue to revolve until they completed their cycle of operation, because selector section G wiper 205 would hold the selector motor and brake release solenoid circuit closed by riding on contactor 224, permitting current from positive battery to pass through motor 206 and solenoid 207, and reach negative 213, through conductor 226, wiper 205, contactor 224 and conductor 227, instead of following the first path through switch 4. After the selector has stopped, and the final total has been sufficiently displayed, switch L is opened, extinguishing all projection lamps *e*, and de-energizing all solenoids 200, which resets all films or their equivalents to zero.

When only a single totalization is required, the selector wipers 205 are operated for one revolution only, by closing switch 5 temporarily. Current on conductor 226 reaches negative 213, through wiper 205, contactor 225, switch 5 and conductor 227, operating motor 206 and brake release solenoid 207. Motor 206 and solenoid 207 continue to operate, for the balance of one cycle of the wipers 205, even after switch 5 has been opened, because wiper 205 of selector section G, by riding on contactor 224, completes the circuit from motor 206 and solenoid 207, through conductor 226, and conductor 227, to negative 213. When G wiper 205 leaves contactor 224 at the end of one revolution, the circuit to motor 206 and solenoid 207 is broken, because the opening of switch 5, which is preferably of the momentary contact type, left contactor 225 electrically disconnected. After the selector wipers 205 have made their revolution and stopped, and after the total has been sufficiently displayed, switch L is opened, extinguishing all projecting lamps e, and de-energizing all solenoids 200, which resets all films or their equivalents to zero.

The connections of the indicator lamps 93 of the indicator board of Figs. 6-8 are shown in Fig. 34 in circuit with the control units a, b, c, in such relation that operation of any of the voting units to aye or nay position will cause an indication thereof in the proper positions adjacent the respective members' names on the indicator board 75. Thus, by the arrangement of my invention indication is made not only of the totals of the aye and nay votes cast and of the number of members not voting, but also of the particular vote, aye or nay, of each voting member. The combined result of the individual and total indications is a full and detailed account of the voting in respect to any one issue.

While I have described my invention in certain of its embodiments I desire that it be understood that modifications may be made that no limitations upon my invention are intended other than may be imposed by the scope of the appended claims.

What I claim as new and desire to secure by Letters Patent of the United States is as follows:

1. In a totalizing machine, total indicating means including a film having a series of individual numbers representing totals thereon, and projection means operatively related to said film for projecting individual numbers therefrom; and means for moving said film to a total indicating position with respect to said projection means including means for storing energy proportional to a total of units to be indicated, means for releasing the stored energy in quantum, means disposed between said means for storing energy and said film and operative upon the release of the stored energy for moving said film continuously to a total indicating position dependent upon the quantum of energy released, and a speed governing device connected with the last said means for controlling the rate of release of the stored energy for effecting uniform movement of said film with a minimum of tension and wear.

2. In a totalizing machine, total indicating means including a device having a series of individual numbers representing totals thereon, and projection means including a source of light operatively related to said device for projecting individual numbers therefrom; means connected with said device for moving said device to a total indicating position with respect to said projection means, and including means for storing energy proportional to a total of units to be indicated, and means for releasing the stored energy in quantum for effecting continuous movement of said device to a total indicating position dependent upon the quantum of energy released; and control means individual to said source of light, said means for storing energy and said means for releasing the stored energy, and actuating means common to each of said control means operative for automatically controlling the operation of said means for storing energy and said means for releasing the stored energy in alternation and the operation of said source of light in synchronism with said means for storing energy.

3. In a totalizing machine, in combination, a plurality of indicators individually operative, total indicating means including a device having a series of individual numbers representing totals thereon and projection means operatively related to said device for projecting predetermined total numbers therefrom, said plurality of indicators and said projection means being arranged for exhibiting individual and total indications in the same field of vision; actuating means connectible with said numbered device for moving said device to a total indicating position with respect to said projection means, a separate plurality of control means, means for connecting said control means individually with said indicators for operating the respective indicators, means for connecting said control means successively with said actuating means for energizing said actuating means cumulatively, and means for engaging said actuating means with said numbered device and releasing the energy accumulated in said actuating means for moving said numbered device to indicating position for projecting the total number of indicators operated.

4. In a totalizing machine, the combination set forth in claim 3 and including a cabinet structure having regularly spaced indicator lamps constituting said indicators mounted with respect to one wall thereof, said projection means disposed within said cabinet structure and operative to project a light beam along a path adjacent said indicator lamps, and light shield means mounted within said cabinet structure intermediate the individual lamps and between said lamps and the path of said light beam.

5. In a totalizing machine, a linear film device bearing a series of individual numbers representing totals regularly spaced thereon, projection means operatively related to said film for projecting individual numbers therefrom, means for initially framing said film with respect to said projection means for establishing a reference position of said film, and means for moving said film continuously from said reference position to a total indicating position with respect to said projection means including means for cumulatively storing intermittent energy impulses coordinated quantitatively with said regularly spaced numbers on said film, and means for releasing said energy impulses in quantum for moving said film continuously to a total indicating position as determined by the quantity of energy accumulated.

CHARLES F. THOMPSON.